US008284216B2

(12) United States Patent
Matsuda (10) Patent No.: US 8,284,216 B2
(45) Date of Patent: Oct. 9, 2012

(54) PROJECTION-TYPE IMAGE DISPLAY SYSTEM, PROJECTOR, AND IMAGE PROJECTION METHOD FOR AVOIDING OBSTACLES IN THE PROJECTION AREA

(75) Inventor: Hideki Matsuda, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 448 days.

(21) Appl. No.: 11/655,913

(22) Filed: Jan. 22, 2007

(65) Prior Publication Data

US 2007/0115396 A1    May 24, 2007

Related U.S. Application Data

(63) Continuation of application No. 10/438,896, filed on May 16, 2003, now Pat. No. 7,626,600.

(30) Foreign Application Priority Data

May 20, 2002 (JP) ................................. 2002-144671
May 2, 2003 (JP) ................................. 2003-127027

(51) Int. Cl.
*G09G 5/373* (2006.01)
*G09G 5/38* (2006.01)
*H04N 9/31* (2006.01)

(52) U.S. Cl. .......................... 345/667; 345/682; 348/745

(58) Field of Classification Search .......... 345/156–158, 345/619, 620, 660, 667, 672, 682; 348/581, 348/582, 578, 744, 745, 747; 353/30, 31
See application file for complete search history.

(56) References Cited

U.S. PATENT DOCUMENTS 5,436,639 A     7/1995   Arai et al.
5,475,447 A    12/1995   Funado
5,701,205 A *  12/1997   Hasushita et al. ............ 359/691
(Continued)

FOREIGN PATENT DOCUMENTS

EP       A2-1 117 080        7/2001
(Continued)

OTHER PUBLICATIONS

Rahul Sukthankar, Dynamic Shadow Elimination for Multi-Projector Displays, 2001, Proceedings of the 2001 IEEE Computer Society Conference on Computer Vision and Pattern Recognition, vol. 2, pp. II-151-II-157.

(Continued)

*Primary Examiner* — Jeffery A Brier
(74) *Attorney, Agent, or Firm* — Oliff & Berridge, PLC (57) ABSTRACT

To provide a projection-type image display system, a projector, a program, an information storage medium, and an image projection method that enable simple changing of a projection position, a liquid-crystal projector is provided with: a sensor which senses a projection target area and outputs sensing information; an edge detection section which outputs detection information, based on the sensing information; a projectable area determination section which determines a projectable area which has no obstructions within the projection target area, based on the detection information; a projection area selection section which selects a projection area within the projectable area, based on a user selection or a predetermined reference; a projection-area/pixel-area associating section and a lens adjustment section which performs predetermined adjustments in such a manner that an image is displayed on the projection area; and an image projection section which projects an image towards the projection area, based on the input image information.

15 Claims, 5 Drawing Sheets

U.S. PATENT DOCUMENTS

| | | | |
|---|---|---|---|
| 5,798,864 A * | 8/1998 | Sekiguchi | 359/559 |
| 5,895,110 A * | 4/1999 | Okada et al. | 353/31 |
| 6,002,505 A | 12/1999 | Kraenert et al. | |
| 6,005,534 A | 12/1999 | Hylin et al. | |
| 6,113,240 A * | 9/2000 | Iizuka | 353/31 |
| 6,167,167 A | 12/2000 | Matsugu et al. | |
| 6,310,726 B1 * | 10/2001 | Iizuka | 359/618 |
| 6,394,557 B2 | 5/2002 | Bradski | |
| 6,575,581 B2 | 6/2003 | Tsurushima | |
| 2003/0025649 A1 | 2/2003 | Wynne Willson | |
| 2004/0036813 A1 | 2/2004 | Matsuda | |

FOREIGN PATENT DOCUMENTS

| | | |
|---|---|---|
| EP | A 1 365 597 | 11/2003 |
| JP | A 11-184447 | 7/1999 |
| JP | A 2002-229546 | 8/2002 |
| JP | A 2003-283964 | 10/2003 |
| WO | WO-A1-00/21065 | 4/2000 |

OTHER PUBLICATIONS

Ramesh Raskar, Multi-Projector Displays Using Camera-Based Registration, Oct. 24-29, 1999, Proceedings Visualization, pp. 161-168 and 522.

D. Hall, MagicBoard: A Contribution to an Intelligent Office Environment, 1999, http://citeseer.ist.psu.edu/hall99magicboard.html., pp. 1-9.

* cited by examiner

PROJECTION-TYPE IMAGE DISPLAY SYSTEM, PROJECTOR, AND IMAGE PROJECTION METHOD FOR AVOIDING OBSTACLES IN THE PROJECTION AREA

This is a Continuation of application Ser. No. 10/438,896 filed May 16, 2003, now U.S. Pat. No. 7,626,600 which claims the benefit of Japanese Patent Applications No. 2002-144671, filed on May 20, 2002, and Japanese Patent Applications No. 2003-127027, filed on May 2, 2003. The disclosure of the prior applications is hereby incorporated by reference herein in its entirety.

BACKGROUND OF THE INVENTION

The present invention relates to a projection-type image display system, a projector, a program, an information storage medium, and an image projection method that enable changes in projection position.

Projection-type image display systems such as liquid-crystal projectors are used in various situations such as classrooms, cinemas, meeting rooms, exhibition halls, and domestic living rooms.

When a liquid-crystal projector or the like is used to project an image, any obstruction between the image projection section and the projection surface will generate a shadow caused by the projection light hitting the obstruction, and the obstruction itself could block the field of view, making the image difficult to see.

In a domestic living room, for example, the liquid-crystal projector would not only be used by the user, but also by the family of that user. For that reason, even if the user has reserved a large area of a wall surface as a projection area, other members of the family could dispose furniture or decorative plants on that wall surface, or the user could cover part of the projection area with furniture without thinking.

Similarly, when product introduction images or advertising images are projected in an exhibition hall or the like, people could enter an area within the projection area unexpectedly, making the images difficult to see.

In such a case, it is usual for the user to move the liquid-crystal projector or change the projection direction of the liquid-crystal projector, to project an image that avoids obstructions, but moving the liquid-crystal projector or changing the projection direction thereof is labor-intensive, and it also necessitates re-calibration.

When a liquid-crystal projector is employed to project an image, the user would also want to project an image on a projection area selected by the user on the basis of the circumstances during the projection.

If the living room and kitchen are integrated into the same room, the user would usually project images on a wall surface of the living room, but might also want to project an image onto a wall surface in the kitchen when cooking.

During a presentation, a right-handed presenter would find it easier to use an indicator rod with an image that is displayed on the right side, as seen from the audience, whereas a left-handed presenter would find it easier to use an indicator rod with an image displayed on the left side.

In such a case, it would be preferable to change the projection position of the image in order to give a more effective presentation, but it would be time-consuming for the presenter to adjust the projection position of the projector manually and perform recalibration.

SUMMARY

The present invention was devised in the light of the above-described problem and may provide a projection-type image display system, a projector, and an image projection method that make it possible to change the projection position in a simpler manner.

To solve the above-described problem, a projection-type image display system and projector in accordance with an aspect of the present invention comprises:

a calibration signal generation section that generates calibration signals;

an image projection section that projects a calibration image onto a projection area, based on the calibration signals;

a sensing section that senses the projection target area on which the calibration image is projected and outputs sensing information;

a detection section that performs edge detection based on the sensing information and outputs detection information that indicates edge in a sensed image;

a projectable area determination section that determines a projectable area within the projection target area, based on the detection information;

a projection area selection section that selects a projection area within the projectable area, based on a user selection or a predetermined reference;

an adjustment section that adjusts the image projection section and adjusts an image to be displayed on the projection area; and an image projection section which projects an image towards the projection area, based on input image information.

A projection-type image display system and projector in accordance with another aspect of the present invention comprises:

a calibration signal generation section that generates calibration signals;

an image projection section that projects a calibration image onto a projection area, based on the calibration signals;

a sensing section that senses the projection target area on which the calibration image is projected and outputs sensing information;

a detection section that performs color-distribution detection based on the sensing information and outputs detection information that indicates color-distribution in a sensed image;

a projectable area determination section that determines a projectable area within the projection target area, based on the detection information;

a projection area selection section that selects a projection area within the projectable area, based on a user selection or a predetermined reference;

an adjustment section that adjusts the image projection section and adjusts an image to be displayed on the projection area; and an image projection section which projects an image towards the projection area, based on input image information.

An image projection method comprising:

generating calibration signals;

projecting a calibration image onto a projection target area, based on the calibration signals;

sensing the projection target area on which the calibration image is projected and outputting sensing information;

performing edge detection based on the sensing information and outputting detection information that indicates edge in a sensed image;

determining a projectable area within the projection target area, based on the detection information;

selecting a projection area within the projectable area, based on a user selection or a predetermined reference;

adjusting an image projection section;
adjusting an image to be displayed on the projection area; and
projecting an image towards the projection area, based on input image information.
An image projection method comprising:
generating calibration signals;
projecting a calibration image onto a projection target area, based on the calibration signals;
sensing the projection target area on which the calibration image is projected and outputting sensing information;
performing color-distribution detection based on the sensing information and outputting detection information that indicates color distribution in a sensed image;
determining a projectable area within the projection target area, based on the detection information;
selecting a projection area within the projectable area, based on a user selection or a predetermined reference;
adjusting an image projection section;
adjusting an image to be displayed on the projection area; and
projecting an image towards the projection area, based on the input image information.

Since the present invention makes it possible for the projection-type image display system or the like to automatically determine a projectable area that does not contain obstructions (such as desks or members of the audience), it enables the user to change the projection position easily.

With the projection-type image display system and the projector, the image projection means may have projection size adjustment means which adjusts a projection size, and the adjustment means may output projection size control information to the image projection means so a calibration image is projected towards a projection target area, the projection area, the projection size control information being used for controlling the projection size adjustment means.

In this projection-type image display system and projector, the projection size adjustment means may adjust a lens zoom ratio for projecting an image in such a manner that a projection range for the projected image becomes a minimum size including the projection area selected by the projection area selection means.

This makes it possible for a projection-type image display system or the like to adjust the projection size automatically, the user can change the projection position in a simpler manner, without having to adjust the projection size.

In particular, it is possible for a projection-type image display system or the like to increase the brightness value of the image and display a brighter image than in a case that an image is displayed in the maximum projection size, by adjusting the zoom ratio of a projection lens in such a manner that the projection area for the projected image becomes a minimum size including the selected area.

In this projection-type image display system and projector, the adjustment means may determine an association between a projection target area based on the sensing information and a pixel area of a spatial light modulator that is part of the image projection means, and may adjust the input image information in such a manner that a size of the image is adjusted.

The image projection method may further comprise determining an association between a projection target area based on the sensing information and a pixel area of a spatial light modulator that is part of the image projection means, and adjusting a size of the image.

This makes it possible for the projection-type image display system or the like to automatically determine the association between the projection target area and the pixel area of the spatial light modulator, it enables the projection of an image of an appropriate image size.

In the projection-type image display system and the projector, the image projection means may have projection direction adjustment means for adjusting a projection direction, and the adjustment means may output projection direction control information to the image projection means in such a manner that an image is projected on the projection area, the projection direction control information controlling the projection direction adjustment means.

The image projection method may further comprise controlling the image projection means to control a projection direction in such a manner that an image is projected onto the projection area.

This makes it possible for the projection-type image display system or the like to adjust the projection direction automatically, the user can change the projection position in a simpler manner, without having to adjust the projection direction.

In the projection-type image display system and the projector, the sensing means may repeat the sensing and outputs the detection information at a predetermined timing, and the projectable area determination means may determine the projectable area anew, based on the newest detection information.

The image projection method may further comprise:
repeating the sensing and outputting the detection information at a predetermined timing; and
determining the projectable area anew, based on the newest detection information.

This makes it possible for the projection-type image display system or the like to automatically adjust the projection of the image into an obstruction-free projection area if the position of an obstruction changes (specifically if the audience should intrude into the projection area) by sensing and performing edge detection repeatedly at a predetermined timing, the user can change the projection position in a simpler manner.

DETAILED DESCRIPTION OF THE EMBODIMENT

The present invention is described below, taking as an example the application thereof to a projection-type image display system that uses a liquid-crystal projector, with reference to the accompanying figures. Note that the embodiment described below does not in any way limit the scope of the invention as laid out in the claims herein. In addition, the entirety of the configuration described with reference to this embodiment is not limited to being essential structural components of the present invention.

Description of Overall System

The description below concerns an example in which a liquid-crystal projector is disposed in a domestic living room to project an image onto a wall.

Figure 1:
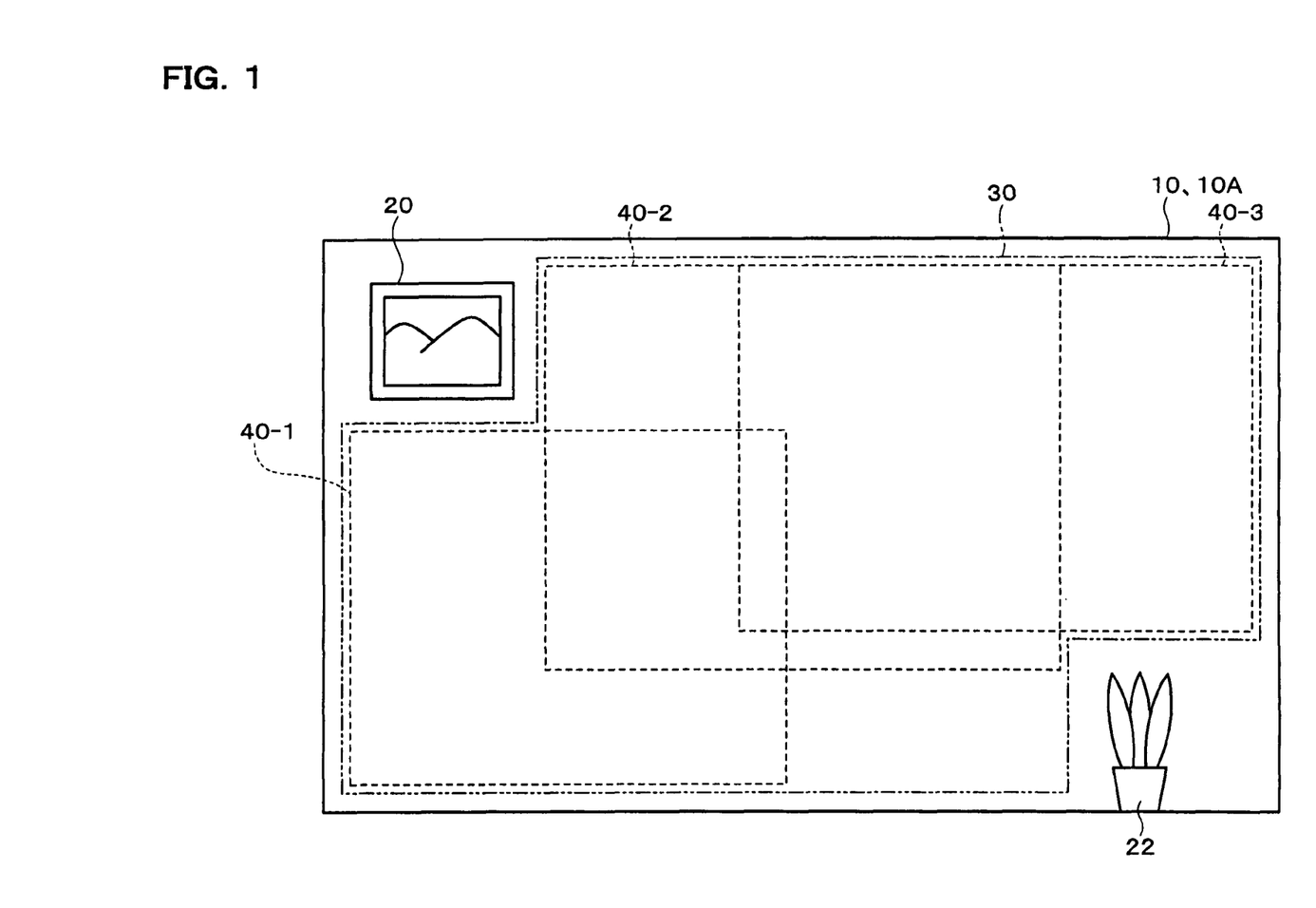
FIG. 1 is a schematic illustrative view of projection areas in accordance with an example of this embodiment.

A schematic illustrative view of projection areas in accordance with an example of this embodiment is shown in FIG. 1.

When a wall surface is used as a projection target area 10 for the projection of an image, the presence of obstructions such as a picture 20 or a decorative plant 22 causes shadows in those portions, making it impossible to project the image suitably.

Since a living room in particular is a location that is used by a plurality of members of the family, the positions of the picture 20 and the decorative plant 22 often change, making it difficult to fix a projection area.

Furthermore, if the living room and the kitchen are integrated into a single room, it would be convenient to project a TV image on the wall of the living room most of the time, but project the image of a recipe on the wall of the kitchen while cooking.

This embodiment of the invention performs edge detection by using a CCD sensor to sense the projection target area 10, determines a plurality of projection areas 40-1 to 40-3 that satisfy a predetermined aspect ratio, determines one projection area based on user selection, and uses that projection area to project the image.

The employment of this method makes it easy to change the projection position, without requiring the user to move the liquid-crystal projector or change the projection position or projection direction manually.

Description of Functional Blocks

The description now turns to the functional blocks of a projection-type image display system that is installed in a liquid-crystal projector, in order to implement this function.

Figure 2:
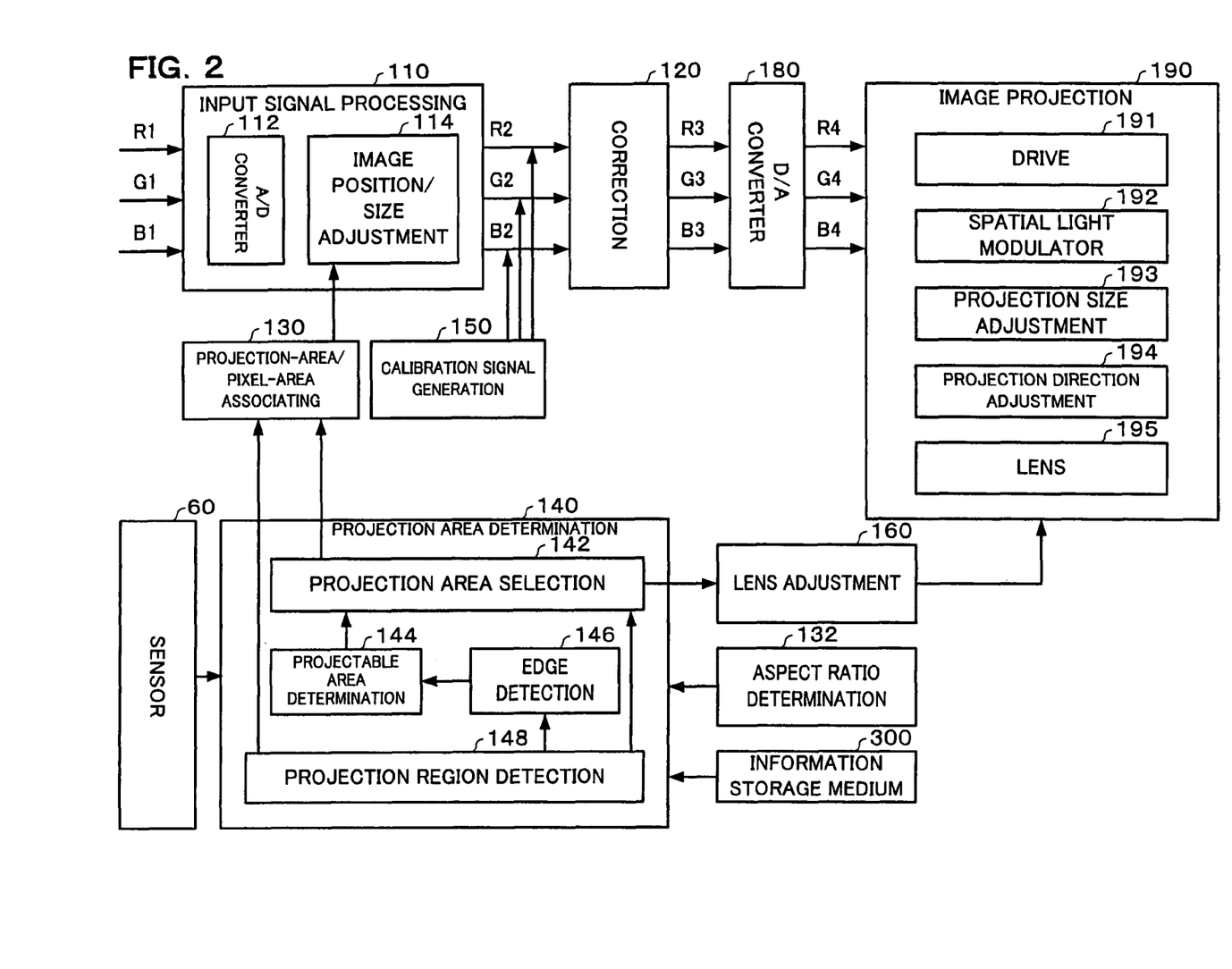
FIG. 2 is a functional block diagram of a projection-type image display system within a liquid-crystal projector in accordance with an example of this embodiment.

A functional block diagram of a projection-type image display system within a liquid-crystal projector in accordance with an example of this embodiment is shown in FIG. 2.

The projection-type image display system comprises a sensor 60, an input signal processing section 110, a correction section 120, a D/A converter section 180, an image projection section 190, a projection-area/pixel-area associating section 130, a projection area determination section 140, a calibration signal generation section 150, a lens adjustment section 160, and an aspect ratio determination section 132.

The input signal processing section 110 converts an R1 signal, a G1 signal, and a B1 signal (which form RGB signals in analog form that is a type of input image information that is input from a personal computer (PC) or the like) into an R2 signal, a G2 signal, and a B2 signal in digital form.

The input signal processing section 110 comprises an A/D converter section 112 that performs this analog-to-digital conversion and an image position/size adjustment section 114 that is part of adjustment means for adjusting the position and size of an image.

Note that the A/D converter section 112 and the D/A converter section 180 are not necessary if only RGB signals in digital format are used in the projection-type image display system.

The calibration signal generation section 150 generates an R2 signal, a G2 signal, and a B2 signal in digital format that are used for displaying a calibration image.

By generating the calibration signals within the liquid-crystal projector in this manner, it is possible for the liquid-crystal projector itself to perform the calibration, without having to input calibration signals to the liquid-crystal projector from an external input device such as a PC. Note that the configuration could also be such that the calibration signal generation section 150 is not provided and the calibration image signals are input from a PC or the like.

The correction section 120 outputs an R3 signal, a G3 signal, and a B3 signal having a color temperature that has been corrected on the basis of a standard setting for the liquid-crystal projector, based on the R2 signal, G2 signal, and B2 signal from the input signal processing section 110.

The D/A converter section 180 converts the R3 signal, G3 signal, and B3 signal from the correction section 120 into an R4 signal, a G4 signal, and a B4 signal in analog format.

The image projection section 190 comprises a drive section 191, a spatial light modulator 192, a projection size adjustment section 193, a projection direction adjustment section 194, and a lens 195.

The drive section 191 drives the spatial light modulator 192, based on the R4 signal, G4 signal, and B4 signal from the D/A converter section 180. The image projection section 190 projects light from a light source through the spatial light modulator 192 and the lens 195.

With this embodiment, the projection area determination section 140 comprising a projection area selection section 142, a projectable area determination section 144, an edge detection section 146, and a projection region detection section 148 is further provided in the liquid-crystal projector.

The projection region detection section 148 detects the region of the projection target area 10 (hereinafter called a projection region 10A), based on sensing information expressed as XYZ values from the sensor 60, which is a sensing means that senses the projection target area 10. Note that is this case, XYZ values are a type of device-independent colors under an international standard determined by the Commission Internationale de l'Eclairage (CIE).

Note that the projection target area 10 and the projection region 10A are shown to be the same size in FIG. 1, to facilitate the description. In this case, the projection region 10A is a region on the projection target area 10 that is illuminated by the projection light.

The edge detection section 146 performs edge detection, based on the XYZ values of the projection region 10A on the projection target area 10, and outputs detection information.

The projectable area determination section 144 identifies projection areas 40-1 to 40-3 within the projection region 10A of the projection target area 10 which have no obstructions such as the picture 20 and which are of at least a fixed size that satisfies the aspect ratio, based on the detection information and a predetermined aspect ratio (such as 16:9 or 4:3) from the aspect ratio determination section 132. In FIG. 1, a representative three projection areas 40-1 to 40-3 are shown, to simplify the description, but in practice a larger number of the projection areas could be obtained. If only one projection area can be obtained, that is selected. The projectable area determination section 144 detects that a portion bounded by the outermost boundary lines of the projection areas is a projectable area 30.

Note that a plurality of the projectable areas 30 could be detected if the projection areas do not overlap.

The projection area selection section 142 selects one projection area, based on a selection indication from the user (such as an indication by a remote controller of the liquid-crystal projector), for selecting one projection area from the plurality of projection areas 40-1 to 40-3 comprised within the projectable area 30.

The lens adjustment section 160 that is part of the adjustment means outputs projection size control information to the projection size adjustment section 193, to adjust the zoom ratio of the lens 195 in such a manner that an image is projected onto the projection area that has been selected by the projection area selection section 142.

The projection size adjustment section 193 adjusts the projection size by adjusting the zoom ratio of the lens 195, based on that projection size control information.

The projection-area/pixel-area associating section 130 that is part of the adjustment means determines the association between the projection area within the projection region 10A on the projection target area 10 and the pixel area of the spatial light modulator 192, based on the projection region 10A on the projection target area 10 that was detected by the projection region detection section 148 and the projection area selected by the projection area selection section 142. Specifically, the projection-area/pixel-area associating section 130 obtains the ratio between the projection region 10A on the projection target area 10 and the pixel area of the spatial light modulator 192.

Instead of this method, the projection-area/pixel-area associating section 130 could obtain the association between coordinates on the projection region 10A (coordinates on the light-receiving element of the sensor 60) and coordinates on a projected image (calibration image). This is because coordinates on the projected image could be converted into coordinates on the image area of the spatial light modulator 192.

Note that the relationship between a pixel that is in the projected image and a pixel portion of the spatial light modulator 192 that displays that pixel is known to the image projection section 190.

The image position/size adjustment section 114 adjusts the input image information in such a manner that the position and size of the image are adjusted, based on the ratio obtained by the projection-area/pixel-area associating section 130 and position information for the projection region 10A on the projection target area 10 of the projection area selected by the projection area selection section 142.

Description of Image Processing Flow

The description now turns to the flow of image processing using these components, with reference to a flowchart.

Figure 3:
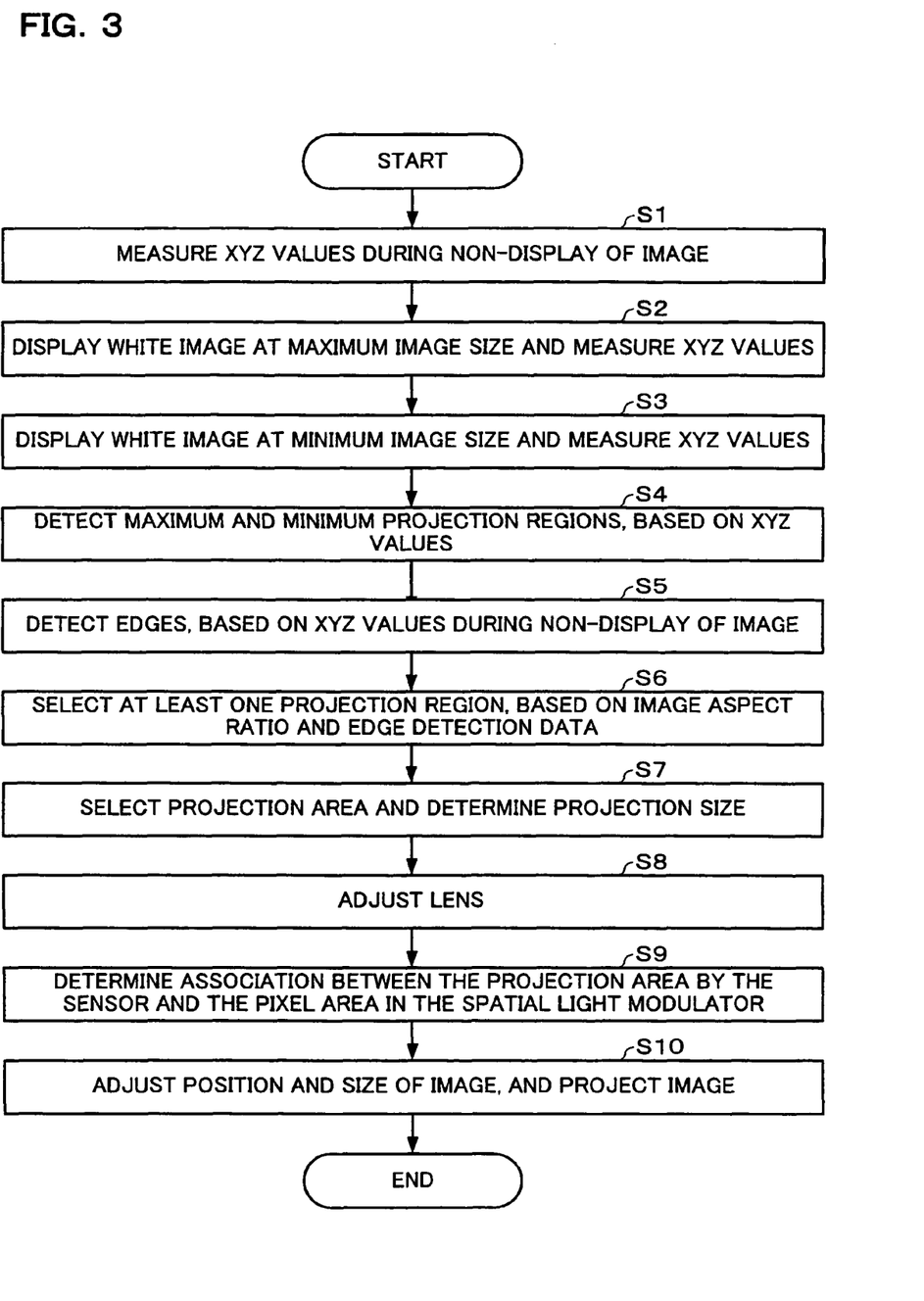
FIG. 3 is a flowchart of the sequence of image projection in accordance with an example of this embodiment.

A flowchart of the sequence of image projection in accordance with an example of this embodiment is shown in FIG. 3.

First of all, the sensor 60 senses the projection target area 10 in a state in which there is no image displayed, in other words, in a state in which nothing is displayed or a completely black image is displayed, and measures the XYZ values of each pixel of that image (step S1).

The lens adjustment section 160 outputs projection size control information for adjusting the zoom ratio of the lens 195 so as to maximize the image size, to the projection size adjustment section 193. The calibration signal generation section 150 generates calibration signals (R2, G2, B2) in such a manner that a full-screen white image is displayed.

The thus-configured liquid-crystal projector displays the white image at the maximum image size and the sensor 60 measures the XYZ values of each pixel of the white image displayed on the projection target area 10 (in other words, each pixel within the sensor 60 that outputs measured values of that white image) (step S2).

In a similar manner, the lens adjustment section 160 outputs projection size control information for adjusting the zoom ratio of the lens 195 so as to minimize the image size, to the projection size adjustment section 193. The calibration signal generation section 150 again generates calibration signals (R2, G2, B2) in such a manner that a full-screen white image is displayed.

The thus-configured liquid-crystal projector displays the white image at the minimum image size and the sensor 60 measures the XYZ values of each pixel of the white image displayed on the projection target area 10 (step S3).

The projection region detection section 148 detects the maximum and minimum projection region 10A, based on the difference between the XYZ values measured when nothing was displayed and the XYZ values measured at the maximum size, and the difference between the XYZ values measured when nothing was displayed and the XYZ values measured at the minimum size (step S4). In this case, a pixel having a difference of at least 5 $cd/m^2$ could be considered to be a pixel comprised within the projection region 10A of the projection target area 10, by way of example. Note that instead of sensing information (XYZ values) obtained when the black calibration image is displayed, it is also possible to use sensing information for the projection region 10A on the projection target area 10 when nothing is displayed.

The edge detection section 146 executes edge detection processing based on the XYZ values measured when nothing was displayed (step S5).

The projectable area determination section 144 determines the projectable area 30 (that is, an area comprising at least one of the projection areas), based on the image aspect ratio from the aspect ratio determination section 132 and the edge detection data from the edge detection section 146 (step S6). More specifically, the projectable area determination section 144 detects edge detection data from the top left of that region to the bottom right thereof, and specifies the maximum area that satisfies a desired aspect ratio (that is, one of the projection areas). If there is a many-sided area such as the projectable area 30 shown in FIG. 1, by way of example, a plurality of projection areas 40-1 to 40-3 is selected.

The projection area determination section 140 outputs information indicating the plurality of projection areas 40-1 to 40-3 selected by the projectable area determination section 144 to the input signal processing section 110, and the image projection section 190 projects to the user a selection image enabling the selection of one projection area from that plurality of projection areas 40-1 to 40-3. In this case, the input signal processing section 110 could have stored therein image information for generating the selection image.

The projection area selection section 142 selects one projection area from the plurality of projection areas 40-1 to 40-3, based on a predetermined criterion (such as the uppermost, lowermost, leftmost, or rightmost) or the user's indication, and determines a lens zoom ratio that ensures that the projection region 10A comprises the selected projection area and also the projection region 10A is of the minimum projection size (step S7).

Note that this use of the minimum projection size ensures that it is possible to increase the brightness in comparison with the maximum projection size. Of course the projection size need not be the minimum.

The lens adjustment section 160 generates projection size control information that ensures that zoom ratio, and the projection size adjustment section 193 adjusts the zoom ratio of the lens 195, based on that projection size control information (step S8).

The projection-area/pixel-area associating section 130 determines the association between the projection area at that zoom ratio and the pixel area of the spatial light modulator 192 (step S9). In this case, the image could be resized so that the entire region of the image represented by the image signal is projected into the selected projection area, or the image could be trimmed for projection into the selected projection area.

The image position/size adjustment section 114 adjusts the digitally converted input image signal in such a manner as to adjust the position and size of the image, based on this association, and outputs digital signals (R2, G2, B2).

The correction section 120 also performs adjustments such as color temperature adjustments on these digital signals (R2, G2, B2), and the D/A converter section 180 outputs analog signals (R4, G4, B4) that have been converted from the digital signals.

The drive section 191 drives the spatial light modulator 192 on the basis of the analog signals (R4, G4, B4), and the projection size adjustment section 193 adjusts the zoom ratio of the lens 195.

In this manner, the image projection section 190 adjusts the position and size of the image and projects the image onto the projection area (step S10).

As described above, this embodiment makes it possible for a projection-type image display system to automatically select the projectable area 30 in which there are no obstructions (such as desks or members of the audience), so that the user can change the projection area easily.

If the living room and kitchen are integrated into the same room, for example, the user would usually project images on a wall surface of the living room, but might also want to project an image onto a wall surface in the kitchen when cooking.

In such a case, this embodiment makes it easy for the user to switch between projection into the living room and projection into the kitchen.

During a presentation, a right-handed presenter would find it easier to use an indicator rod with an image that is displayed on the right side, as seen from the audience, whereas a left-handed presenter would find it easier to use an indicator rod with an image displayed on the left side.

In such a case, this embodiment makes it possible to project an image at a position preferred by the user, without the user having to adjust the projection position manually.

Since this embodiment also makes it possible for the projection-type image display system to adjust the projection size automatically, it enables a simpler changing of the projection position, without requiring the user to adjust the projection size.

Furthermore, since this embodiment makes it possible for the projection-type image display system to automatically determine the association between the projection region 10A on the projection target area 10 and the pixel area of the spatial light modulator 192, it enables the projection of an image at the appropriate image size at the appropriate location.

Description of Hardware

Note that the hardware described below by way of example can be used to implement the above described components.

Figure 4:
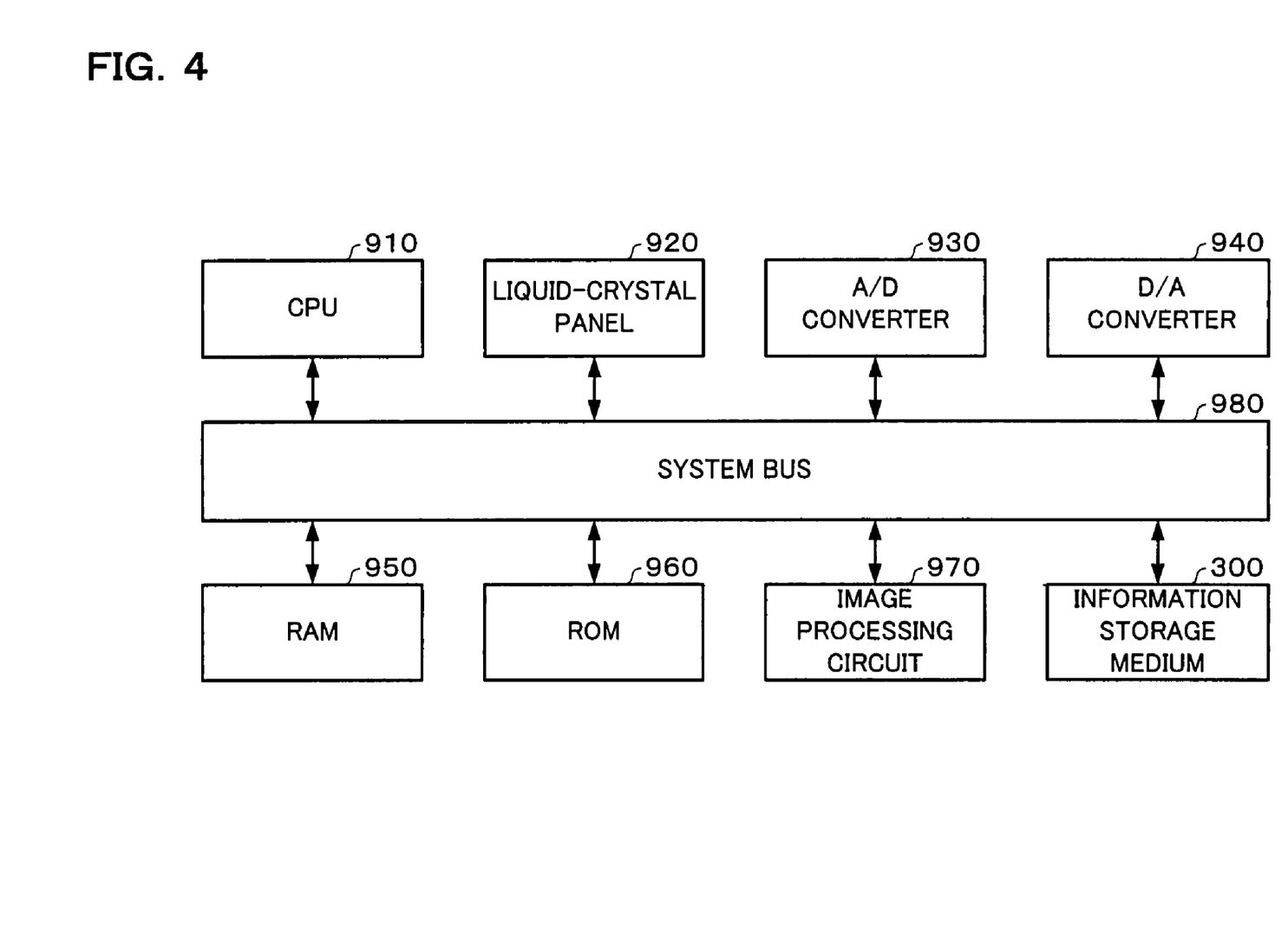
FIG. 4 is a block diagram of the hardware of the projection-type image display system within the liquid-crystal projector in accordance with an example of this embodiment.

A block diagram of the hardware of a projection-type image display system within a liquid-crystal projector in accordance with an example of this embodiment is shown in FIG. 4.

For example, the configuration could be implemented by an A/D converter 930 or the like as the A/D converter section 112; a D/A converter 940 or the like as the D/A converter section 180; a ROM 960 or the like in which is stored a liquid-crystal light bulb driver as the drive section 191; a liquid crystal panel 920 and liquid crystal light valves as the spatial light modulator 192; an image processing circuit 970 and a CPU 910 or the like as the projector color converter section 120, the projection area selection section 142, the projectable area determination section 144, the edge detection section 146, the projection region detection section 148, the projection-area/pixel-area associating section 130, the aspect ratio determination section 132, and the lens adjustment section 160; RAM 950 or the like as the calibration signal generation section 150; a generic lens zooming mechanism or the like as the projection size adjustment section 193; a generic direction control mechanism as the projection direction adjustment section 194; and a sensor that is capable of extracting XYZ values from a multi-pixel sensor such as a CCD sensor or CMOS sensor as the sensor 60. Note that these components can exchange information between themselves over a system bus 980. Note also that these portions could be implemented in a hardware fashion by circuitry, or they could be implemented in a software fashion by drivers.

In addition, these functions could be implemented by a computer within the liquid-crystal projector reading out a program from an information storage medium 300.

The information storage medium 300 could be a CD-ROM, DVD-ROM, ROM, RAM, or HDD, by way of example, and the method of reading the program therefrom could be a direct method or an indirect method.

Instead of the information storage medium 300, it is also possible to download a program that implements the above-described functions, from a host device over a network, in order to implement the above-described functions.

Modifications

For example, the projectable area 30 may be determined based on information other than the edge detection information although the aforementioned embodiment has been described as to the projectable area determination section 144 determining the projectable area 30 based on the edge detection information in the sensed image from the edge detection section 146. For example, the projectable area determination section 144 may determine the projectable area 30 based on the color distribution in the sensed image.

In other words, the projectable area 30 can be selected by detecting the distribution of XYZ values representing colors, for example, since, in FIG. 1, the XYZ values relating to the obstruction such as the decorative plant 22 or the like in the sensed image are different from the XYZ values in the projectable area 30. The technique of selecting the projectable area 30 based on the color distribution will be described below.

Figure 5:
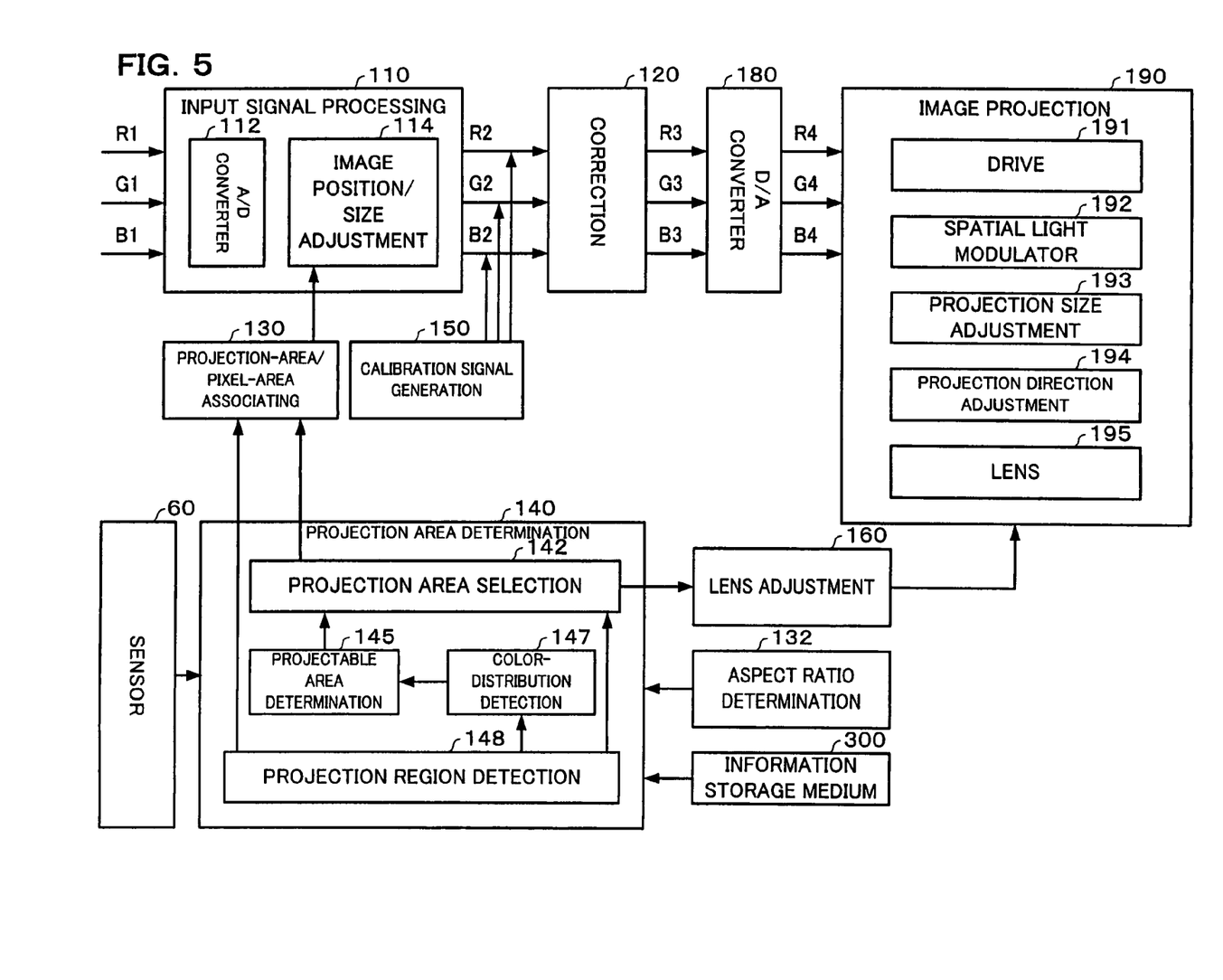
FIG. 5 is a functional block diagram of a projection-type image display system within a liquid-crystal projector in accordance with an example of this embodiment.

FIG. 5 is a functional block diagram of a projection-type image display system in a liquid-crystal projector according to an example of this embodiment.

In this embodiment, the edge detection section 146 is replaced by a color-distribution detection section 147 which is designed to output detection information indicating the color distribution in the sensed image (which may be the whole or part of the sensed image) from the sensor 60 while the projectable area determination section 144 is replaced by a projectable area determination section 145.

After the process in the projection region detection section 148 (step S4) described in connection with FIG. 3, the color-distribution detection section 147 detects the color distribution in the projection region 10A based on the sensing information (XYZ values) relating to a portion corresponding to a projection region having the maximum image size in the sensed image when nothing is displayed.

More particularly, the color-distribution detection section 147 generates the histogram (or frequency distribution) of XYZ values for a predetermined image processing unit (a pixel block constructed by a fixed number of pixels along the horizontal and vertical directions, one pixel or the like).

And, the color-distribution detection section 147 detects a range of X-value having upper frequency (XP1 to XP2) in the histogram of X value. Similarly, the color-distribution detection section 147 detects a range of Y-value having upper frequency (YP1 to YP2) and a range of Z-value having upper frequency (ZP1 to ZP2). These ranges are optional. For example, they may be identical with one another or different from one another.

The color-distribution detection section 147 then outputs these pieces of color-distribution information (XP1 to XP2, YP1 to YP2 and ZP1 to ZP2) toward the projectable area determination section 145.

The projectable area determination section 145 determines the projectable area 30, based on an aspect ratio of image from the aspect ratio determination section 132 and the information of detected color distribution from the color-distribution detection section 147.

More particularly, the projectable area determination section 145 selects an area AX having an X-value in the range of X-value (XP1 to XP2) from the color-distribution detection section 147 based on the sensing information relating to a portion corresponding to the projection area 10A in the sensed image. In addition, the sensing information has an ordinate position, an abscissa position, X-value, Y-value and Z-value for each coordinate position. Therefore, the projectable area determination section 145 can select the area AX since it can detect the ordinate and abscissa positions in the coordinates having the X-value which can be used as a searching key. Similarly, areas AY and AZ for Y and Z values may be selected.

According to such a procedure, the projectable area determination section 145 selects the area AX having the X-value in the range of X-value (XP1 to XP2), the area AY having the Y-value in the range of X-value (YP1 to YP2) and the area AZ having the Z-value in the range of Z-value (ZP1 to ZP2) in addition to an area AA (the projectable area 30 in FIG. 1, for example) in which the areas AX, AY and AZ overlap each other.

In such a manner, the projectable area 30 can be selected. The remaining procedure portion may be accomplished by various steps after the above-mentioned step S6 in FIG. 3.

By adopting such a technique based on the color distribution, the liquid-crystal projector according to this embodiment can select the projection area as a portion satisfying the aspect ratio among an area which has the same color and is not been influenced by the environment (due to the fluorescent lamp or the like) or is influenced by the environment, even if part of the projection target area 10 has been influenced by that environment.

The liquid-crystal projector according to this embodiment can perform the processing at a higher speed and in a more efficient manner since the edge detection can be omitted by adopting the technique based on the color distribution.

However, the technique of detecting the color distribution is not limited to the aforementioned technique. For example, the range of XYZ values may be determined by calculating with different coefficient values or by using a certain function. Moreover, the indexes for detecting the color distribution may be in the form of RGB values, rather than the XYZ values.

If part of the projection target area 10 is an empty space when the liquid-crystal projector is used outdoors or if part of the projection target area 10 is on a glass window which will not reflect the projected light from the liquid-crystal projector when it is used in a class room, the liquid-crystal projector may perform the following process.

For example, if the liquid-crystal projector is to project a rectangular image, it can determine the aforementioned projection area by repeatedly projecting and imaging points or lines indicative of four corners in the image while narrowing the projection range and detecting these points or lines through the sensor 60 before the four corners in the sensed image are associated with the coordinates of the four corners in the spatial light modulator 192.

Moreover, the edge detection may be carried out by use of sensing information indicative of differences between the XYZ values of the sensed image relating to the monochromatic white-colored calibration image and the XYZ values of the sensed image relating to the monochromatic black-colored calibration image although this embodiment has been described as to the single black-colored calibration image used to perform the edge detection or the like by the liquid-crystal projector.

In such a manner, even if the projection target area 10 includes areas of differently influenced environment, the liquid-crystal projector can perform the color-distribution detection and the like while correcting such difference.

Further, for example, the configuration could be such that the lens adjustment section 160 outputs projection direction control information for controlling the projection direction to the projection direction adjustment section 194, instead of the projection size.

This would make it possible to adjust the projection direction automatically, thus making it easy for the user to change the projection position without having to adjust the projection direction.

The projection size could also be fixed so that only the projection direction is changed. This would enable simple changing of the projection position.

In addition, the selection of the projection area by the user could be done by a button on the projector itself of by a remote-control action, and the user could use a physical indication or a verbal indication.

In the above-described embodiment, the maximum projectable area 30 was obtained initially by selecting at least one projection area that satisfies the aspect ratio, but at least one projection area that satisfies the aspect ratio could be selected within the projectable area 30 after the obstruction-free projectable area 30 has been obtained.

It is also possible to perform parallax distortion correction or automatic focus adjustment during the projection.

The projection area in the above-described embodiment was a rectangle, but a shape other than a rectangle can equally well be used as the projection area, such as a circle.

Furthermore, the image projection processing of FIG. 3 could be repeated at a predetermined timing (such as every predetermined time, or whenever the presenter changes).

Since this makes it possible to automatically adjust the image so that it is projected into an obstruction-free projection area, by performing the sensing and edge detection repeatedly at a predetermined timing if there is a change in the position of an obstruction or if more of the audience encroach into the projection area, the user can change the projection position in a simpler manner. In addition, the projection area could be determined from the positions of obstructions.

The projection-type image display system of this embodiment was described above as being applied to a liquid-crystal projector but it can also be applied to various other types of projection-type display systems such as a projector using a digital micromirror device (DMD) as the spatial light modulator. Note that DMD is a trademark registered to Texas Instruments Inc. of the USA. In addition, the projector is not limited to a front-projection type; it could equally well be a rear-projection type of projector.

Other than a domestic environment such as the above-described living room, the present invention is also effective for projecting images in commercial applications such as meeting rooms, medical facilities, advertisement locations, educational locations, cinemas, and exhibition halls.

Note that the above-described functions of the projection-type image display system could be implemented by the liquid-crystal projector itself, by way of example, or they could be implemented by processing distributed between a plurality of processing devices (such as the liquid-crystal projector and a PC).

What is claimed is:

1. A projection-type image display system comprising:
   an image projection section that, based on calibration image signals, projects a black calibration image and a white calibration image sequentially onto a projection target area, or that projects nothing and the white calibration image sequentially, the white calibration image being projected at a maximum image size;
   a sensing section that:
      outputs black sensing information by sensing the projection target area when nothing is projected or sensing the black calibration image; and
      outputs white sensing information by sensing the white calibration image;
   a detection section that performs edge detection based on the black sensing information and outputs detection information that indicates edges in the sensed projection region;
   a projectable area determination section that determines a projectable area within the projection target area, based on the detection information;
   a projection area selection section that selects a projection area within the projectable area, based on a user selection or a predetermined reference;
   an adjustment section that adjusts the image projection section so that the image projection section projects an image onto the projection area.

2. The projection-type image display system as defined by claim 1, wherein the image projection section has a projection size adjustment section that adjusts a projection size, and
   wherein the adjustment section outputs projection size control information to the image projection section so that the image is projected onto the projection area, the projection size control information being used for controlling the projection size adjustment section.

3. The projection-type image display system as defined by claim 2, wherein the adjustment section determines an association between the projection target area and a pixel area of a spatial light modulator that is part of the image projection section, and adjusts the input image information in such a manner that a size of the image is adjusted.

4. The projection-type image display system as defined by claim 3, further comprising:
   a projection region detection section that detects a projection region, based on a difference between the black sensing information and the white sensing information, and
   wherein the adjustment section determines the association between the projection target area and the pixel area of the spatial light modulator, based on the projection region detected by the projection region detection section and the projection area selected by the projection area selection section.

5. The projection-type image display system as defined by claim 1, wherein the image projection section has a projection direction adjustment section that adjusts a projection direction, and
   wherein the adjustment section outputs projection direction control information to the image projection section in such a manner that the image is projected onto the projection area, the projection direction control information controlling the projection direction adjustment section.

6. The projection-type image display system as defined by claim 1, wherein the sensing section repeats the sensing and outputs the white and black sensing information at a predetermined timing, and
   wherein the projectable area determination section determines the projectable area anew, based on a newest detection information.

7. A projection-type image display system comprising:
   an image projection section that, based on calibration image signals, projects a black calibration image and a white calibration image sequentially onto a projection target area, or that projects nothing and the white calibration image sequentially, the white calibration image being projected at a maximum image size;
   a sensing section that:
      outputs black sensing information by sensing the projection target area when nothing is projected or sensing the black calibration image; and
      outputs white sensing information by sensing the white calibration image;
   a detection section that performs color distribution detection based on the black sensing information and outputs detection information that indicates color distribution in the sensed projection region;
   a projectable area determination section that determines a projectable area within the projection target area, based on the detection information;
   a projection area selection section that selects a projection area within the projectable area, based on a user selection or a predetermined reference;
   an adjustment section that adjusts the image projection section so that the image projection section projects an image onto the projection area.

8. A projector comprising:
   an image projection section that, based on calibration image signals, projects a black calibration image and a white calibration image sequentially onto a projection target area, or that projects nothing and the white calibration image sequentially, the white calibration image being projected at a maximum image size;
   a sensing section that:
      outputs black sensing information by sensing the projection target area when nothing is projected or sensing the black calibration image; and
      outputs white sensing information by sensing the white calibration image;
   a detection section that performs edge detection based on the black sensing information and outputs detection information that indicates edges in the sensed projection region;
   a projectable area determination section that determines a projectable area within the projection target area, based on the detection information;
   a projection area selection section that selects a projection area within the projectable area, based on a user selection or a predetermined reference;

an adjustment section that adjusts the image projection section so that the image projection section projects an image onto the projection area.

9. A projector comprising:

an image projection section that, based on calibration image signals, projects a black calibration image and a white calibration image sequentially onto a projection target area, or that projects nothing and the white calibration image sequentially, the white calibration image being projected at a maximum image size;

a sensing section that:
  outputs black sensing information by sensing the projection target area when nothing is projected or sensing the black calibration image; and
  outputs white sensing information by sensing the white calibration image;

a detection section that performs color distribution detection based on the black sensing information and outputs detection information that indicates color distribution in the sensed projection region;

a projectable area determination section that determines a projectable area within the projection target area, based on the detection information;

a projection area selection section that selects a projection area within the projectable area, based on a user selection or a predetermined reference;

an adjustment section that adjusts the image projection section so that the image projection section projects an image onto the projection area.

10. An image projection method comprising:

projecting, based on calibration image signals, a black calibration image and a white calibration image sequentially onto a projection target area, or projecting nothing and the white calibration image sequentially, the white calibration image being projected at a maximum image size;

outputting black sensing information by sensing the projection target area when nothing is projected or sensing the black calibration image; and outputting white sensing information by sensing the white calibration image;

performing edge detection based on the black sensing information and outputting detection information that indicates edges in the sensed projection region;

determining a projectable area within the projection target area, based on the detection information;

selecting a projection area within the projectable area, based on a user selection or a predetermined reference;

adjusting an image projection section so that the image projection section projects an image onto the projection area.

11. The image projection method as defined by claim 10, further comprising:

controlling the image projection section to adjust a projection size so that the image is projected onto the projection area.

12. The image projection method as defined by claim 10, further comprising:

determining an association between the projection target area and a pixel area of a spatial light modulator that is part of the image projection section, and adjusting a size of the image.

13. The image projection method as defined by claim 10, further comprising:

controlling the image projection section to control a projection direction in such a manner that the image is projected onto the projection area.

14. The image projection method as defined by claim 10, further comprising:

repeating the sensing and outputting the black and white sensing information at a predetermined timing; and determining the projectable area anew, based on the newest detection information.

15. An image projection method comprising:

projecting, based on calibration image signals, a black calibration image and a white calibration image sequentially onto a projection target area, or projecting nothing and the white calibration image sequentially, the white calibration image being projected at a maximum image size;

outputting black sensing information by sensing the projection target area when nothing is projected or sensing the black calibration image and outputting white sensing information by sensing the white calibration image;

performing color-distribution detection based on the sensing information and outputting detection information that indicates color distribution in the sensed projection region;

determining a projectable area within the projection target area, based on the detection information;

selecting a projection area within the projectable area, based on a user selection or a predetermined reference;

adjusting an image projection section so that the image projection section projects an image onto the projection area.

* * * * *